United States Patent
Trieschmann et al.

[15] 3,673,141
[45] June 27, 1972

[54] MOLDING MATERIAL BASED ON BITUMEN

[72] Inventors: Hans-Georg Trieschmann, Hambach; Leo Unterstenhoefer, Limburgerhof; Heinz Berbner, Weiher, all of Germany

[73] Assignee: Badische Anilin- & Soda-Fabrik Aktiengesellschaft, Ludwigshafen (Rhine), Germany

[22] Filed: Oct. 29, 1969

[21] Appl. No.: 872,367

[30] Foreign Application Priority Data

Nov. 5, 1968 Germany ...................... P 18 07 071.8
June 27, 1969 Germany ...................... P 19 32 588.3

[52] U.S. Cl. ...................................................... 260/28.5 AS
[51] Int. Cl. ...................................................... C08f 45/52
[58] Field of Search .............. 260/28.5 AS, 28.5 AV, 28.5 A; 208/41, 44

[56] References Cited

UNITED STATES PATENTS

| | | | |
|---|---|---|---|
| 3,144,423 | 8/1964 | Belak | 260/28.5 AS |
| 3,154,508 | 10/1964 | Clelland | 260/28.5 AS |
| 3,249,567 | 5/1966 | Vigneault | 260/28.5 AS |
| 3,309,329 | 3/1967 | Schultz | 260/28.5 AV |
| 3,336,252 | 8/1967 | Raichle | 260/28.5 AS |
| 3,395,110 | 7/1968 | Crady | 260/28.5 AS |
| 3,440,073 | 4/1969 | Fowler | 208/22 |
| 3,442,841 | 5/1969 | Adelman | 260/28.5 AS |
| 3,505,260 | 4/1970 | Woodruff | 260/28.5 AS |

Primary Examiner—Morris Liebman
Assistant Examiner—P. R. Michl
Attorney—Johnston, Root, O'Keeffe, Keil, Thompson & Shurtleff

[57] ABSTRACT

Molding material comprising (a) a specially selected bitumen left as a residue in the distillation of petroleum which has been deacidified with calcium hydroxide and (b) an olefin polymer. The molding material may be pigment-colored and is used in the form of sheeting for insulation in construction.

5 Claims, No Drawings

MOLDING MATERIAL BASED ON BITUMEN

The present invention relates to molding material consisting of:

a. 100 parts by weight of a specially selected bitumen which has a penetration of 1 to 150 (German Standard Specification DIN 1,995), and b 25 to 200 parts by weight of an olefin polymer, with or without c. one or more conventional additives.

Molding materials comprising bitumen and an olefin polymer are well-known; they have a number of valuable properties. There is a certain disadvantage however that the molding material (for example in the form of granules) and moldings prepared therefrom (for example film or sheeting) tend to stick together. It is also somewhat disadvantageous that the molding material can only be colored with difficulty, if at all.

It is an object of the present invention to provide molding material of the abovementioned type which is free or substantially free from the said disadvantages.

We have found that this object is achieved when the molding material contains a specially selected bitumen.

In accordance with this invention a molding material consists of:

a. 100 parts by weight of bitumen which has a penetration (German Standard Specification DIN 1,995) of 1 to 150, preferably 25 to 90;

b. 25 to 200, preferably 75 to 125, parts by weight of a copolymer containing polymerized units of $b^1$. 30 to 97 percent by weight of ethylene and $b^2$. 3 to 70 percent by weight of a vinyl ester of a $C_2$ to $C_3$ alkanecarboxylic acid and/or a $C_1$ to $C_4$ alkyl ester of a $C_3$ to $C_4$ alkenecarboxylic acid (the sum of the percentages being 100); with or without c. one or more conventional additives.

The molding material according to the invention is characterized by containing as the bitumen (a) a distillation residue of a petroleum deacidified with calcium hydroxide which (apart from a small amount of impurities) consists of:

1. 24 to 40 percent, preferably 26 to 35 percent, by weight of bituminous aromatic hydrocarbons;
2. 16 to 25 percent, preferably 18 to 23 percent, by weight of bituminous naphthenic hydrocarbons;
3. 27 to 45 percent, preferably 30 to 41 percent, by weight of calcium naphthenates and calcium sulfonates;
4. 11 to 20 percent, preferably 13 to 18 percent, by weight of calcium hydroxide and calcium sulfate; and
5. 0.5 to 5 percent, preferably 0.7 to 2.5 percent, by weight of sulfur; the sum of the percentages under (1) to (5) being 100.

The following information is given as regards the components of the molding material according to this invention:

a. bitumens of the said special specification are commercially available. They are obtained as residues in the distillation of petroleum when the petroleum has been deacidified with calcium hydroxide prior to distillation. Penetration in this specification means the depth of penetration of a standard needle in one-tenths of a millimeter under the conditions of German Standard Specification DIN 1,995.

b. Homopolymers of ethylene or propylene and copolymers of ethylene with other ethylenically unsaturated compounds may be used as components (b). The polymers are prepared by conventional methods and are commercially available. Thus homopolymers of ethylene obtained by the high or low pressure polymerization methods are suitable for the molding material. Mixtures of homopolymers of ethylene and propylene are also suitable. The ratio of the two components in the mixture may be varied at will. As the proportion of polyethylene increases, the resistance to cold of the molding material improves. Copolymers of ethylene which are suitable for the production of the molding material contain polymerized units of vinyl propionate or preferably vinyl acetate and/or a $C_1$ to $C_4$ alkyl ester of acrylic acid and/or a $C_1$ to $C_4$ alykyl ester of methacrylic acid. It is preferred to use copolymers of ethylene and n-butyl acrylate. The copolymers contain 30 to 97 percent by weight of ethylene units and 3 to 70 percent by weight of units of the other ethylenically unsaturated compounds, the sum of the percentages being 100. Mixtures of homopolymers and copolymers may also be used for the production of the molding material according to the invention.

c. Conventional additives optionally contained in the molding material include particularly conventional particulate or fibrous fillers, for example diatomaceous earth, sand, glass fibers, slate powder, gypsum, chalk, mineral wool and titanium dioxide. Up to 50 percent by weight of fillers (with reference to components (a) and (b) ) is used for the production of the molding material.

It is particularly advantageous that this molding material (in contrast to molding material of ordinary bitumen and olefin polymer) can be colored with pigments, for example with iron oxide, titanium dioxide, copper phthalocyanine, polychlorocopper phthalocyanine or with titanium dioxide/polychlorocopper phthalocyanine pigments. The pigments are used as a rule in an amount of from 0.1 to 5 percent by weight with reference to the special bitumen and olefin polymer.

The molding material according to the invention may be prepared by conventional methods, for example by homogenizing the components by means of kneaders, stirred apparatus or by rolling at temperatures of from about 120° to 280° C.

There is no sticking together of molding material according to this invention, even after having been stored for long periods under pressure. It is very advantageous for the use of the molding material that it can be colored. Moldings, film, sheeting for sealing purposes and also carpet backings can be prepared from molding material according to the invention.

The invention is illustrated by the following Examples.

EXAMPLE 1

The starting materials are:

a. 100 parts by weight of bitumen having a penetration of 80 and also having the following data:

1. twenty-nine percent by weight of bituminous aromatic hydrocarbons;
2. Twenty percent by weight of bituminous naphthenic hydrocarbons;
3. Thirty-five percent by weight of calcium naphthenates and calcium sulfonates (weight ratio 3.2: 1);
4. Fifteen percent by weight of calcium hydroxide and calcium sulfate (weight ratio 1:5.3); and
5. One percent by weight of sulfur.

b. 100 parts by weight of a copolymer of:

1. Eighty-two percent by weight of ethylene and
2. Eighteen percent by weight of n-butyl acrylate units.

c. Six parts by weight of a pigment of titanium dioxide and polychlorocopper phthalocyanine (weight ratio 1:1).

The said components are homogenized by means of a kneader at a temperature of 140° C and then granulated. The granules obtained do not agglomerate and have a pronounced green color. The granules are melted in an extruder and extruded into sheeting having a thickness of 2 mm which is used for roof insulation. The sheeting may be easily welded together. The tear resistance of the sheeting according to German Standard Specification DIN 53,455 is 41 kg/cm² and the elongation at break is 850 percent.

EXAMPLE 2

The following components (a) to (c) are homogenized in a kneader at 170° C and then granulated: (parts by weight)

a. 100 parts of bitumen having a penetration of 80. Further date of the bitumen are (percent and ratios by weight):

1. Twenty-nine percent of bituminous aromatic hydrocarbons;
2. Twenty percent of bituminous naphthenic hydrocarbons;

3. Thirty-five percent of calcium naphthenates and calcium sulfonates (ratio 302:1);
4. Fifteen percent of calcium hydroxide and calcium sulfate (ratio 1:5.3); and
5. One percent of sulfur.

b. 100 parts of polypropylene having a melting point range of from 157° to 162° C; melt index 0.2.

c. Six parts of a pigment of titanium dioxide and polychlorocopper phthalocyanine (ratio 1:1).

The granules do not agglomerate and have a pronounced green color. They are melted in an extruder and extruded into sheeting having a thickness of 2 mm which is used for insulation in construction. The tear resistance of press-molded test specimens prepared from this material is 85 kg/cm², and the elongation at break is 600 percent (according to DIN 53,455).

EXAMPLE 3

The following components (a) and (b) are homogenized in a continuous kneader at a temperature of 190° C and then granulated (parts, percent and ratios by weight):

a. 100 parts of bitumen having a penetration of 15 and the following data:
1. Twenty-nine percent of bituminous aromatic hydrocarbons;
2. Twenty percent of bituminous naphthenic hydrocarbons;
3. Thirty-one percent of calcium naphthenates and calcium sulfonates (ratio 3.2:1);
4. Fifteen percent of calcium hydroxide and calcium sulfate (ratio 1:5.3); and
5. Five percent of sulfur.

b. 100 parts of polyethylene having a density of 0.945 g/ccm and a melt index of 6 (MI 190/21.6).

The tear resistance of press-molded test specimens prepared from the granules is 140 kg/cm² and the elongation at break is 750 percent (measured according to German Standard Specification DIN 53,455). The granules are melted in an extruder and extruded into sheeting 2 mm in thickness. The sheeting is used for insulation of roofs.

EXAMPLE 4

Components (a) and (b) are homogenized in a kneader at a temperature of 170° C and then granulated; parts, percentages and ratios are by weight:
a. 100 parts of bitumen having a penetration of 25 according to DIN 1,995 and having the following further data:
1. Twenty-seven percent of bituminous aromatic hydrocarbons;
2. Twenty-two percent of bituminous naphthenic hydrocarbons;
3. Thirty-seven percent of calcium naphthenates and calcium sulfonates (ratio 3.2:1);
4. Eleven percent of calcium hydroxide and calcium sulfate (ratio 1:5.3); and
5. Three percent of sulfur.

b. 50 parts of polypropylene having a melting point range of 157° to 162° C and a melt index of 0.2.

The tear resistance of press-molded test specimens made from this molding material is 52 kg/cm² and the elongation at break is 480 percent (measured according to DIN 53,455). The granules do not agglomerate even after prolonged storage. Sheeting is prepared from the granules and used for insulation in construction.

EXAMPLE 5 a. 100 parts by weight of bitumen having penetration of 80 and consisting of the following components:
1. Twenty-nine percent by weight of bituminous aromatic hydrocarbons;
2. Twenty percent by weight of bituminous naphthenic hydrocarbons;
3. Thirty-five percent by weight of calcium naphthenates and calcium sulfonates (weight ratio 3.2:1);
4. Fifteen percent by weight of calcium hydroxide and calcium sulfate (weight ratio 1:5.3); and
5. One percent by weight of sulfur, b. 100 parts by weight of a copolymer built up from units of 75 parts of ethylene and 25 parts of vinyl acetate; and c. Three parts by weight of a titanium dioxide/iron oxide pigment (weight ratio 1:1) are homogenized in a kneader at 150° C. The molding material has a pronounced red color. Granules or sheeting prepared from this molding material do not agglomerate or block when stored.

The granules are melted in an extruder and extruded into a sheeting having a thickness of 2 mm. The sheeting is used for insulating swimming pools.

EXAMPLE 6

The following are mixed at a temperature of 140° C in a continuous kneader:
a. 100 parts by weight of bitumen having a penetration of 25 which consists of:
1. Twenty-seven parts by weight of bituminous aromatic hydrocarbons;
2. Twenty-two parts by weight of bituminous naphthenic hydrocarbons;
3. Thirty-seven parts by weight of calcium naphthenates and calcium sulfonates (weight ratio 3.2:1);
4. Eleven parts by weight of calcium hydroxide and calcium sulfate (weight ratio 1:5.3); and
5. Three parts by weight of sulfur; and b. 50 parts by weight of a copolymer of 82 parts of ethylene and 18 parts of n-butyl acrylate. The melt index of the copolymer is 1.9. After the components have been homogenized, a black colored molding material is obtained which is then granulated. The granules do not agglomerate even upon prolonged storage.

The molding material is used for backing carpets. The molding material granules are remelted in an extruder and extruded onto a needleloom fabric followed by pressing the layers together.

EXAMPLE 7

One hundred parts by weight of bitumen as described in Example 6 is mixed with 200 parts by weight of a copolymer of 88 parts by weight of ethylene and 12 parts by weight of vinyl acetate at 170° C in a continuous kneader. The melt index of the copolymer is 4.0. After the material has been mixed it is granulated, dark brown granules being obtained, which do not agglomerate even upon prolonged storage. Test specimens prepared from the granules have a tear resistance of 120 kg/cm² according to DIN 53,455 and an elongation at break of 500 percent. Sheeting is prepared from the granules and used for sealing in civil engineering construction.

We claim:
1. A composition of matter comprising:
   a. 100 parts by weight of bitumen having a penetration of from 1 to 150, said bitumen being a distillation residue which has been obtained by distillation of crude oil which has been treated with calcium hydroxide and which consists essentially of:
   1. 24 to 40 percent by weight of bituminous aromatic hydrocarbons;
   2. 16 to 25 percent by weight of bituminous naphthenic hydrocarbons;
   3. 27 to 45 percent by weight of calcium salts of naphthenic acids and sulfonic acids;
   4. 11 to 20 percent by weight of calcium hydroxide and calcium sulfate; and
   5. 0.5 to 5 percent by weight of sulfur; and
   b. 25 to 200 parts by weight of a homopolymer of ethylene or propylene or a copolymer of 30 to 97 percent by weight of ethylene and 70 to 3 percent by weight of one of the compounds: vinyl acetate, vinyl propionate, and a $C_1$ to $C_4$ alkyl ester of acrylic acid and/or a $C_1$ to $C_4$ alkyl ester of methacrylic acid.

2. A composition of matter as claimed in claim 1 which also contains a filler in an amount of up to 50 percent by weight with reference to components (a) and (b).

3. A composition of matter as claimed in claim 1 in which component (b) is a copolymer of 30 to 97 percent by weight of ethylene and 70 to 3 percent by weight of an acrylic $C_1$ to $C_4$ ester.

4. A composition of matter as claimed in claim 1 wherein component (b) is a copolymer of 30 to 97 percent by weight of ethylene and 70 to 3 percent by weight of vinyl acetate.

5. A composition of matter as claimed in claim 1 in which components (1) to (5) are present in the following amounts in percent by weight: (1) 26 to 35, (2) 18 to 23, (3) 30 to 41, (4) 13 to 18 and (5) 0.7 to 2.5.

* * * * *